(12) United States Patent
Yang (10) Patent No.: US 8,587,529 B2
(45) Date of Patent: Nov. 19, 2013

(54) IMAGE DISPLAY SYSTEM WITH A TOUCH PANEL SENSING DEVICE

(75) Inventor: Kai-Chieh Yang, Chu-Nan (TW)

(73) Assignee: Chimei Innolux Corporation, Chu-Nan (TW)

(*) Notice: Subject to any disclaimer, the term of this patent is extended or adjusted under 35 U.S.C. 154(b) by 1095 days.

(21) Appl. No.: 12/404,096

(22) Filed: Mar. 13, 2009

(65) Prior Publication Data

US 2009/0231298 A1    Sep. 17, 2009

(30) Foreign Application Priority Data

Mar. 14, 2008    (TW) .............................. 097109061 A (51) Int. Cl.
*G06F 3/041*    (2006.01)
(52) U.S. Cl.
USPC ....................................................... 345/173
(58) Field of Classification Search
None
See application file for complete search history.

(56) References Cited

U.S. PATENT DOCUMENTS

| 7,310,088 | B2 * | 12/2007 | Senzui et al. ................. 345/173 |
| 2003/0184697 | A1 * | 10/2003 | Ueda .............................. 349/122 |
| 2004/0100452 | A1 * | 5/2004 | Oh et al. ........................ 345/173 |
| 2004/0263670 | A1 * | 12/2004 | Yamasaki ...................... 348/340 |
| 2006/0177979 | A1 * | 8/2006 | Tu .................................. 438/243 |
| 2007/0268243 | A1 * | 11/2007 | Choo et al. .................... 345/104 |
| 2008/0018613 | A1 * | 1/2008 | Kim et al. ...................... 345/173 |
| 2008/0198140 | A1 * | 8/2008 | Kinoshita et al. ............. 345/173 |
| 2008/0246741 | A1 * | 10/2008 | Hinata .......................... 345/173 |
| 2008/0264699 | A1 * | 10/2008 | Chang et al. ................ 178/18.01 |

* cited by examiner

*Primary Examiner* — Joseph Haley
*Assistant Examiner* — Emily Frank
(74) *Attorney, Agent, or Firm* — Liu & Liu (57) ABSTRACT

The present invention relates to an image display system with a touch panel sensing device, which applied in an electronic device, the touch panel sensing device including a substrate, a black matrix, a first planarizing layer, a conductive metal, vertical and horizontal electrode layers, a second planarization (PLN) layer, and a color resist layer disposed from top to bottom, wherein the vertical and horizontal electrode layers disposed between the first planarizing layer and the second PLN layer; therefore, by placing two perpendicularly electrode layers with the first planarizing layer on the same side, effectively to avoid chromatic aberration and reduce the thickness of the touch panel.

20 Claims, 7 Drawing Sheets

IMAGE DISPLAY SYSTEM WITH A TOUCH PANEL SENSING DEVICE

FIELD OF THE INVENTION

The present invention relates to an image display system, especially to an image display system with a touch panel sensing device.

BACKGROUND OF THE INVENTION

Recently, since the integration of information appliance products, a touch panel device in the market of human-machine interface (HMI) replaces the traditional devices, such as a keyboard and a mouse. Moreover, the progressing of the touch panel devices that people can easily use and operate handily, the touch panel soon spread to apply in many fields, for example, portable telecommunication devices, banking systems, medical registering systems, warehouse security surveillances and publican information guidance systems etc.

According to the different structure of touch panel sensors, the touch panel devices can be categorized in five specific types: a resistive touch panel, a surface acoustic wave (SAW) touch panel, a capacitive touch panel, a infrared touch panel and a electromagnetic inductive touch panel. However, the capacitive touch panel has been widely used in the large-size panel products, and the capacitive touch panel can either be touched with a bare finger or a conductive device, such as a touch pen for touch panel input device, which altered the value of capacitors and calculates the intersection of X axis and Y axis from the measurements of continuous electrical current across the capacitive sensor, then the controller send related responses to the touch panel device.

Figure 1:
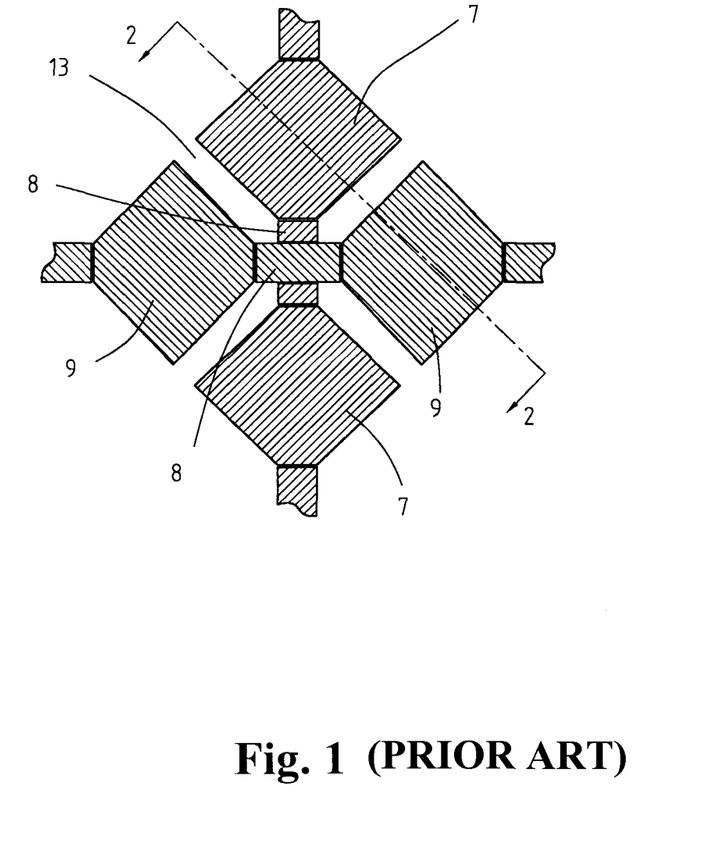
FIG. 1 illustrates the partial top view of a conventional electrode layer structure.

With reference to FIG. 1, conventional electrode layers of a capacitive touch panel were disposed in matrix. Each of the vertical electrode layers (7) was coupled with a conducting wire (8), and each of the horizontal electrode layers (9) was coupled with the conducting wire (8). In addition, a gap (13) was defined between the vertical electrode layer (7) and the horizontal electrode layer (9) such that the vertical electrode layer (7) and the horizontal electrode layer (9) were not contact to avoid short-circuit.

Figure 2:
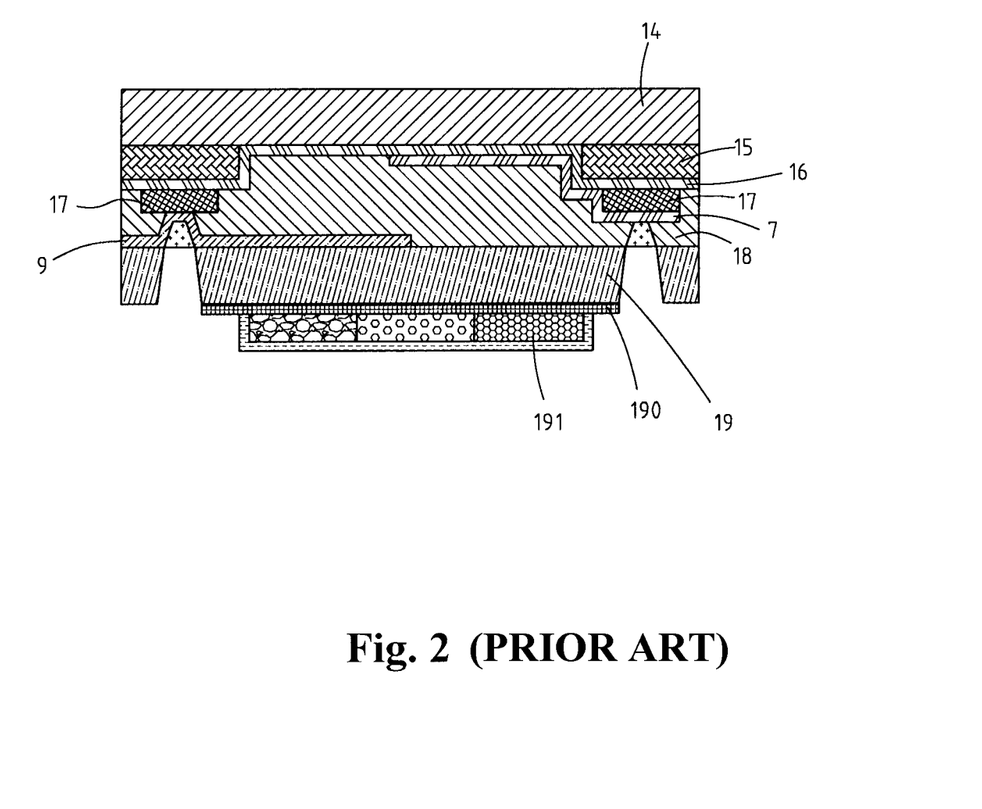
FIG. 2 illustrates the sectional view of a conventional touch panel structure.

Refer to FIG. 2, the capacitive touch panel, which includes a substrate (14). From top to bottom, a black matrix (15), an first planarizing layer (overcoat layer) (16), a conductive metal (17), vertical electrode layer (7), a second planarizing (PLN) layer (18), the conductive metal (17), horizontal electrode layer (9), a third PLN layer (19) are disposed on the substrate (14), wherein the capacitive touch panel further includes a shielded layer (190) disposed on the third PLN layer (19) to reduced VCOM voltage electrical interference with the vertical electrode layer (7) and the horizontal electrode layer (9). At last, a color photo-resist layer (191) is located under the shielded layer (190).

However, the vertical electrode layer (7) and the horizontal electrode layer (9) were disposed oppositely to the second PLN layer (18). When the light are passing through the substrate (14), the chromatic aberration caused by refraction of the second PLN layer (18) results in asymmetrical color-balance effect of the touch panel. Moreover, refer to FIG. 1, the gap (13) defined between the vertical electrode layer (7) and the horizontal electrode layer (9) could avoid that the vertical electrode layer (7) and the horizontal electrode layer (9) contact to each other. If the gap (13) is too large, the users may glimpse the gap (13). Thus, more improvement should be made to the apparel of the touch panel.

Furthermore, since the vertical electrode layer (7) and the horizontal electrode layer (9) are disposed oppositely to the second PLN layer (18), and the third PLN layer (19) is required to planarize the touch panel, the third PLN layer (19) made the touch panel thick and that is a challenge for pursued the explicit thin shape of the touch panel.

SUMMARY OF THE INVENTION

The present invention is to provide an image display system with a touch panel sensing device that solves chromatic aberration and glimpse of the internal structure of the capacitive touch panel, which results from light refraction.

To achieve above propose, the primary object of present invention is to dispose a vertical electrode layer and a horizontal electrode layer in the same side to a PLN layer. Therefore, no further requirement to dispose another PLN layer to planarize the panel and avoids chromatic aberration from the PLN layer.

The structure of the present invention includes a substrate, and a black matrix, a first planarizing layer, a conductive metal, a vertical electrode layer, a horizontal electrode layer, a second PLN layer and a color resist layer disposed top-down on the substrate.

Accordingly, the vertical electrode layer and the horizontal electrode layer are disposed on the same side of the PLN layer according to the present invention, to avoid the chromatic aberration when the light passing through the PLN layer, such that the thickness of the touch-panel could reduce.

BRIEF DESCRIPTIONS OF THE DRAWINGS

The foregoing aspects, as well as many of the attendant advantages and features of this invention will become more apparent by reference to the following detailed description, when taken in conjunction with the accompanying drawings, wherein.

DETAILED DESCRIPTIONS OF THE PREFERRED EMBODIMENT

The features and other details of invention will now be more particularly described. It will be understood that particular embodiments described herein are shown by way of illustration and not as limitations of the invention. The principal features of this invention can be employed in various embodiments without departing from the scope of the invention, and to provide more clearly comparison of the present invention structure and the traditional structure, herein are shown by using same illustrative symbolization.

Figure 3:
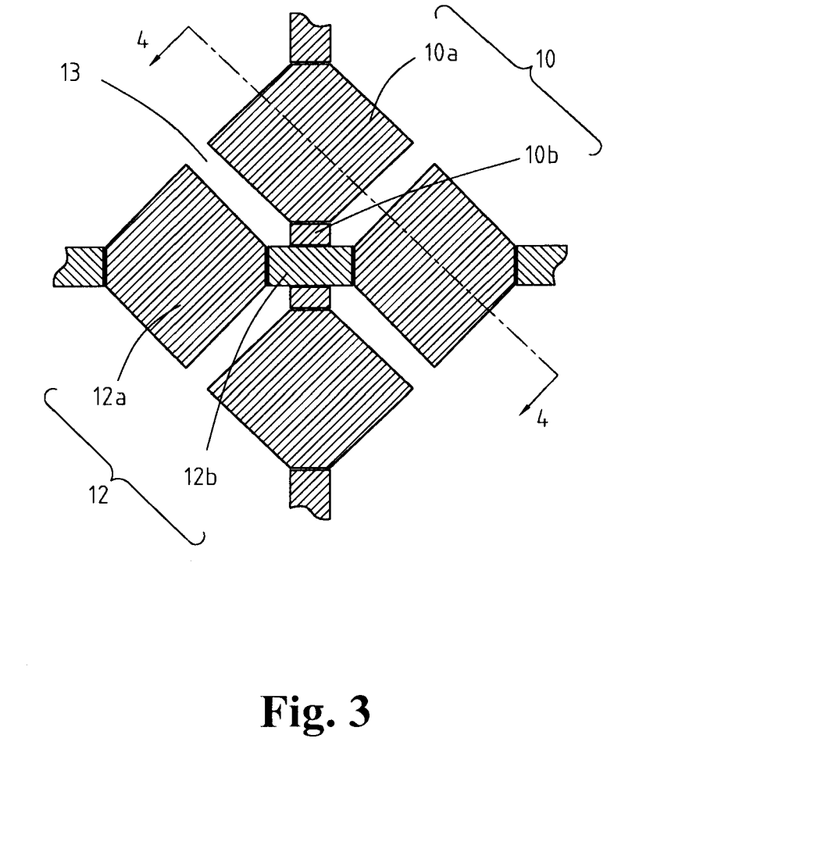
FIG. 3 illustrates the partial top view of an electrode layer in accordance with the present invention.

Please refer to FIG. 3. FIG. 3 illustrates the partial top view of an electrode layer of the capacitive touch panel in the image display system according to the present invention. The vertical electrode layer (10) and horizontal electrode layer (12) of capacitive touch panel were disposed in matrix, wherein the vertical and horizontal electrode layers (10) (12) are formed from the same layer. Each of the vertical electrode layer (10) includes several first electrode portions (10a) connected by a several first connecting wires (10b) and each of the horizontal electrode layer (12) also includes several second electrode portions (12a) connected by several second connecting wires (12b), wherein the first and second connecting wires (10b, 12b) are formed form different layers.

In addition, a gap (13) such as, for example, 100 μm~150 μm, defined between the vertical electrode layer (10) and the horizontal electrode layer (12). The difference of structure between the present invention and the prior art is the former used a jumper to stagger the first and second conducting wires (10b,12b) on intersection of the first and second conducting wires (10b,12b).

Figure 4:
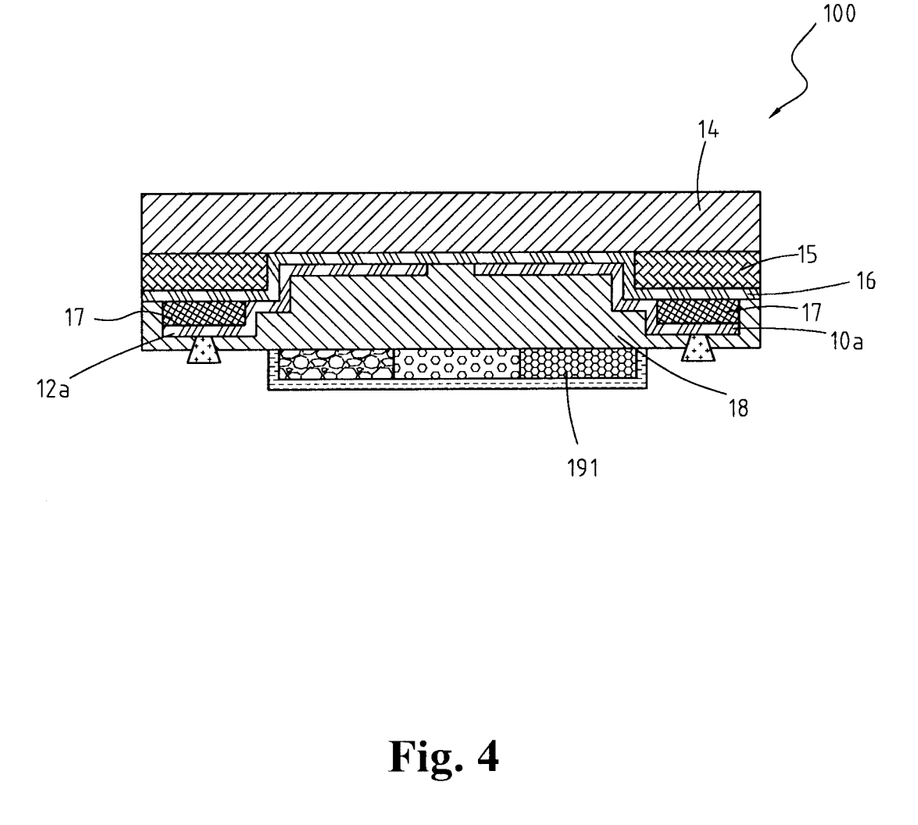
FIG. 4 illustrates the sectional view of a touch panel structure in accordance with the present invention.

With reference to FIG. 4, the capacitive touch panel includes a substrate (14). From top to bottom, a black matrix (15), a first planarizing layer (16), a conductive metal (17), a vertical electrode layer (10), a horizontal electrode layer (12), a second PLN layer (18) are disposed on the substrate (14), wherein the capacitive touch panel further includes a color resist layer (191) disposed on the second PLN layer (18).

Accordingly, the vertical electrode layer (10) and the horizontal electrode layer (12) were disposed on the same side of the second PLN layer (18). Thus, when the light passed through the substrate (14), the light could be directly reflected by the vertical electrode layer (10) and the horizontal electrode layer (12) at the same time, hence the chromatic aberration effect could be solved.

Figure 5:
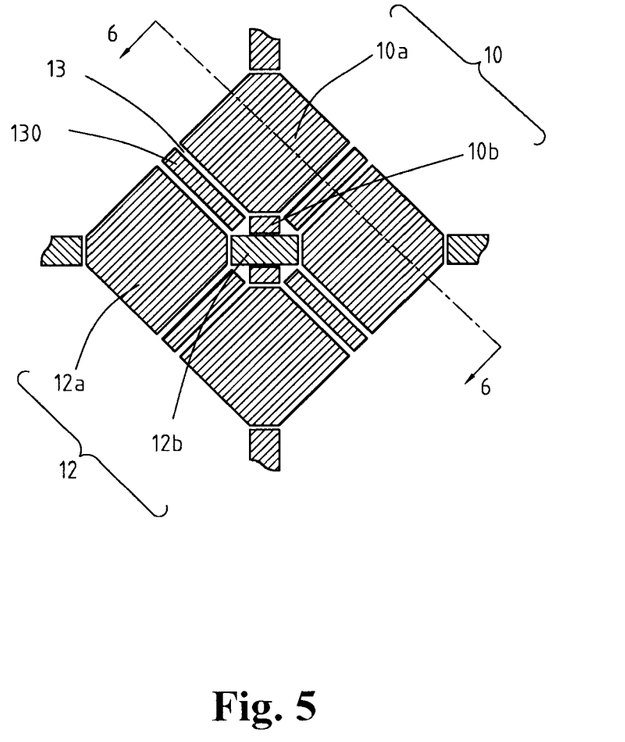
FIG. 5 is a top view illustrating a electrode layer of the touch panel structure in accordance with the present invention.

With reference to FIGS. 4-5, FIG. 4 is a sectional view of a touch panel structure, and FIG. 5 is a top view illustrating a electrode layer of the touch panel structure in the present invention; consequently the arrangement of the touch panel structure is to avoid the glimpse of the shape to electrode layers.

Alternatively, in a touch panel sensing device (100). A dummy bar (130) with an adequate width according to the gap is disposed in the gap (13) between the vertical electrode layer (10) and the horizontal electrode layer (12) on the second PLN layer (18), wherein the dummy bar (130), vertical electrode layer (10) and horizontal electrode layer (12) are disposed on the same side of the second PLN layer (18). Furthermore, the dummy bar (130) is using the same material as the electrode layers (10), (12), such as Indium Tin Oxides (ITO), and the dummy bar (130) partitioned an adequate distance (for example, 20 μm~50 μm) to insure the vertical electrode layer (10) and the horizontal electrode layer (12) against to the short circuit.

According to the above-mentioned embodiment, the present invention solves the problem of the glimpse of the shape to electrode layers; a better apparent sight obtained herein the capacitive touch panel.

Figure 6:
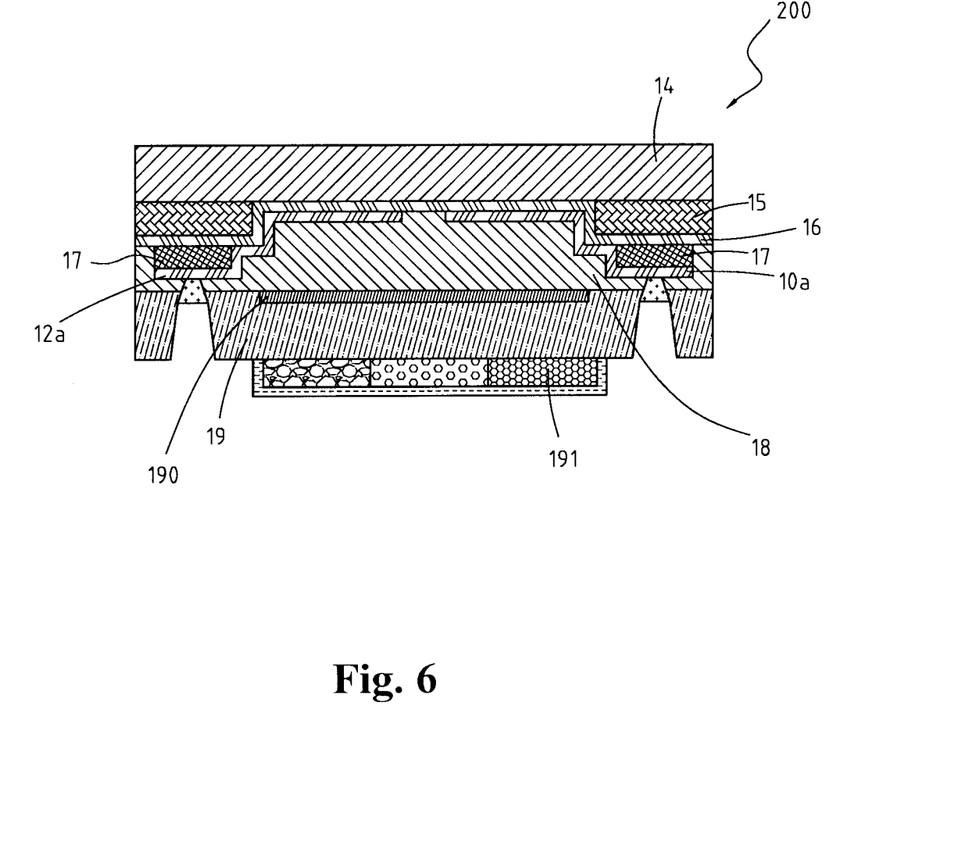
FIG. 6 illustrates the sectional view of the touch panel structure according to an embodiment of the present invention.

In addition, with reference to FIG. 6, is an alternatively embodiment replaced with different arrangement of the touch panel of FIG. 3, and the difference is a shielded layer (190) disposed between the second PLN layer (18) and the color resist layer (191) of a touch panel sensing device (200), wherein the shielded layer (190) reduced electronic interference from VCOM voltage, and the third PLN layer (19) disposed between the shielded layer (190) and the color resist layer (191). Thus, assured the touch panel of present invention works perfectly under none interference condition.

Moreover, the second PLN layer (18) and the third PLN layer (19) are composed of silicon oxygen or silicon nitride.

Figure 7:
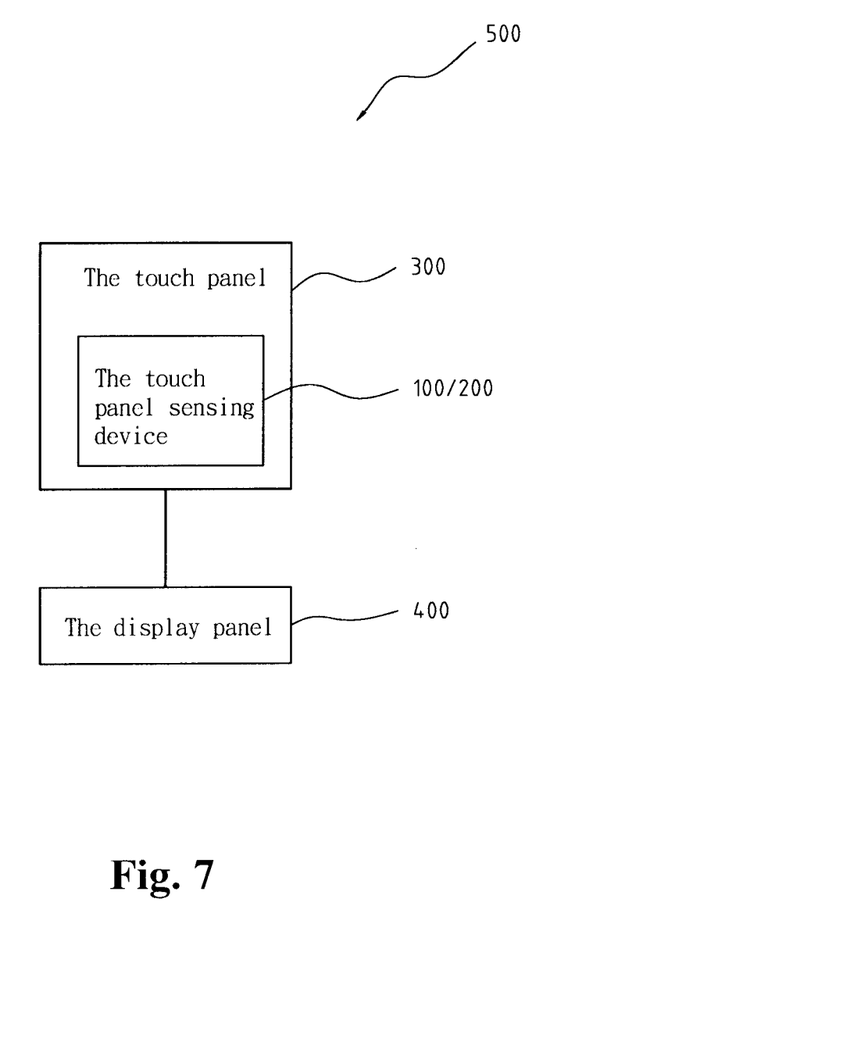
FIG. 7 is a block diagram illustrating the structure of the image display system having touch panel combined with display panel.

The FIG. 7 showing the image display system with a touch panel sensing device applied in an electronic device (500) of the present embodiment, wherein the electronic device (500) included a touch panel (300) for user interaction and a display panel (400) for displaying images, and the touch panel (300) further including the touch panel sensing device (100) shown in FIG. 4 or the touch panel sensing device (200) shown in FIG. 6. Moreover, the case in point of the electronic device (500) and the display panel (400), the electronic device (500) could be a digital camera, a portable DVD player, a television (TV), a mobile display, a personal digital assistant (PDA), a monitor, a laptop, a tablet personal computer or a mobile phone. The display panel (400) could be a liquid crystal display (LCD), plasma display panel (PDP), an organic light-emitting diode display (OLED display) or a thin film transistor liquid crystal display (TFT-LCD), although above-mentioned examples merely to help clarify the present invention, the examples not intend to limit the present invention.

The present invention proposed to dispose the both vertical electrode layer and the horizontal electrode layer in the same side to the PLN layer, to avoided chromatic aberration from setting the electrode layers of the PLN layer in opposition to each other, and efficiently decrease the thickness of the touch panel for future demand in explicit thin shape. Furthermore, by installed the dummy bar, the problem of the glimpse of the electrode circuit could be solved from the apparel of the touch panel. Thus, according to the inimitable structure of the present invention, the present invention solves the existing problem of the capacitive touch panel, and proper to the requirements of future touch panel development.

What is claimed is:

1. An image display system with a touch panel sensing device comprising:
   a touch panel sensing device, wherein the touch panel sensing device comprises:
      at least one substrate, a first planarizing layer, and a second planarizing layer being respectively disposed from top to bottom; and
      a vertical electrode layer and a horizontal electrode layer disposed between the first planarizing layer and the second planarizing layer, and the vertical and horizontal electrode layers are formed from the same layer,
      wherein a dummy bar is disposed in a gap between the vertical electrode layer and the horizontal electrode layer, and wherein the dummy bar, vertical electrode layer and horizontal electrode layer are disposed on the same side of the second planarizing layer.

2. The image display system of claim 1, wherein the touch panel sensing device further comprises:
   a black matrix disposed between the substrate and the first planarizing layer.

3. The image display system of claim 1, wherein the touch panel sensing device further comprises:
   a conductive metal disposed between the vertical electrode layer and the first planarizing layer and disposed between the horizontal electrode layer and the first planarizing layer.

4. The image display system of claim 1, wherein the touch panel sensing device further comprises:
   a color resist layer, disposed on the second planarizing layer.

5. The image display system of claim 4, wherein the touch panel sensing device further comprises:

a shielded layer, disposed between the second planarizing layer and the color resist layer.

6. The image display system of claim 1, wherein the vertical electrode layer and the horizontal electrode layer are patterned in a matrix array.

7. The image display system of claim 6, wherein each of the vertical electrode layer comprises:
   a plurality of first electrode portions; and
   a plurality of first connecting wires, connected to the first electrode portions.

8. The image display system of claim 7, wherein each of the horizontal electrode layer comprises:
   a plurality of second electrode portions; and
   a plurality of second connecting wires, connected to the second electrode portions, and wherein the first and second connecting wires are formed from different layers.

9. The image display system of claim 8, wherein the gap is defined between the first and the second electrode portions.

10. The image display system of claim 9, wherein a first distance formed between the first electrode portion and the dummy bar having a range from 100 μm to 500 μm, and a second distance formed between the second electrode portion and the dummy bar having a range from 100 μm to 500 μm.

11. The image display system of claim 9, wherein a first distance formed between the first electrode portion and the dummy bar having a range from 20 μm to 50 μm, and a second distance formed between the second electrode portion and the dummy bar having a range from 20 μm to 50 μm.

12. The image display system of claim 5, wherein the touch panel sensing device further comprises:
   a third planarizing layer disposed between the shielded layer and the color resist layer.

13. The image display system of claim 12, wherein the second planarizing layer and the third planarizing layer are made of inorganic material.

14. The image display system of claim 12, wherein the inorganic material is silicon oxygen.

15. The image display system of claim 12, wherein the inorganic material is silicon nitride.

16. The image display system of claim 9, wherein the dummy bar are formed from the same layer and same material with the vertical and horizontal electrode layers.

17. The image display system of claim 1 further comprising a display panel.

18. The image display system of claim 17, wherein the display panel is a liquid crystal display panel, a plasma display panel, an organic light-emitting diode display panel or a thin film transistor liquid crystal display panel.

19. The image display system of claim 1, further comprising an electronic device, wherein the electronic device is a digital camera, a portable DVD player, a television, a mobile display, a personal digital assistant (PDA), a monitor, a laptop, a tablet personal computer or a mobile phone.

20. An image display system with a touch panel sensing device comprising:
   a touch panel sensing device, wherein the touch panel sensing device comprises:
   at least one substrate, a first planarizing layer, and a second planarizing layer being respectively disposed from top to bottom;
   a vertical electrode layer and a horizontal electrode layer disposed between the first planarizing layer and the second planarizing layer, and the vertical and horizontal electrode layers are formed from the same layer; and
   a third planarizing layer disposed between a shielded layer and a color resist layer,
   wherein the vertical electrode layer and the horizontal electrode layer are patterned in a matrix array,
   wherein each of the vertical electrode layer comprises:
      a plurality of first electrode portions; and
      a plurality of first connecting wires, connected to the first electrode portions,
   wherein each of the horizontal electrode layer comprises:
      a plurality of second electrode portions; and
      a plurality of second connecting wires, connected to the second electrode portions, and wherein the first and second connecting wires are formed from different layers,
   wherein a gap is defined between the first and the second electrode portions, and a dummy bar is disposed in the gap, and
   wherein a first distance formed between the first electrode portion and the dummy bar having a range from 20 μm to 50 μm, and a second distance formed between the second electrode portion and the dummy bar having a range from 20 μm to 50 μm.

* * * * *